(12) United States Patent  (10) Patent No.: US 8,712,230 B2
Koga  (45) Date of Patent: Apr. 29, 2014

(54) LENS BARREL AND IMAGING DEVICE

(75) Inventor: Akira Koga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/561,082

(22) Filed: Jul. 30, 2012

(65) Prior Publication Data

US 2013/0077949 A1  Mar. 28, 2013

(30) Foreign Application Priority Data

Sep. 22, 2011  (JP) .................................. 2011-206940
Jun. 6, 2012  (JP) .................................. 2012-128557

(51) Int. Cl.
 *G02B 7/04* (2006.01)

(52) U.S. Cl.
 USPC .......................................................... 396/144

(58) Field of Classification Search
 USPC .......................................................... 396/144
 See application file for complete search history.

(56) References Cited

U.S. PATENT DOCUMENTS

| 4,456,356 | A | * | 6/1984 | Okabe ........................... 396/103 |
| 4,917,846 | A | | 4/1990 | Takase et al. |
| 5,222,407 | A | * | 6/1993 | Sekiguchi ........................ 74/411 |
| 5,592,250 | A | * | 1/1997 | Shimizu .......................... 396/79 |
| 5,701,208 | A | | 12/1997 | Sato et al. |
| 6,008,954 | A | | 12/1999 | Shintani et al. |
| 6,434,331 | B1 | | 8/2002 | Araoka et al. |
| 6,498,624 | B1 | | 12/2002 | Ogura et al. |
| 6,580,571 | B2 | * | 6/2003 | Sasaki et al. .................. 359/823 |
| 7,099,573 | B2 | * | 8/2006 | Ikemizo .......................... 396/62 |
| 7,280,287 | B2 | | 10/2007 | Yamane |
| 7,680,409 | B2 | | 3/2010 | Kurosawa |
| 7,690,851 | B2 | | 4/2010 | Yamane et al. |
| 7,758,261 | B2 | | 7/2010 | Ohkuma |
| 7,792,422 | B2 | * | 9/2010 | Mori ............................. 396/144 |
| 7,864,241 | B2 | | 1/2011 | Iwasaki |
| 7,898,745 | B2 | | 3/2011 | Matsui et al. |

(Continued)

FOREIGN PATENT DOCUMENTS

JP  S62-259816 A  11/1987
JP  H05-034563 A  2/1993

(Continued)

OTHER PUBLICATIONS

Non-final Office Action for the related U.S. Appl. No. 13/561,080, issued Sep. 16, 2013.

(Continued)

*Primary Examiner* — Rodney Fuller
(74) *Attorney, Agent, or Firm* — Shinjyu Global IP

(57) ABSTRACT

The lens barrel includes a first frame, a second frame, a drive actuator, and a transmission mechanism. The second frame includes a substantially cylindrical main body and a gear portion. The gear portion is disposed on the inner peripheral part of the main body. The gear portion transmits the drive force of the drive actuator via the transmission mechanism. The transmission mechanism includes a first transmission gear portion that engages with the gear portion, and a second transmission gear portion that is provided coaxially with the first transmission gear portion. The transmission mechanism includes a clutch. The clutch can temporarily disengage the transmission of the drive force between the first transmission gear portion and the second transmission gear portion. The imaging device includes the above-mentioned lens barrel and an imaging element that converts an optical image formed by the above-mentioned lens barrel into image data.

6 Claims, 9 Drawing Sheets

(56) References Cited

U.S. PATENT DOCUMENTS

| | | |
|---|---|---|
| 7,929,049 B2 | 4/2011 | Yamane et al. |
| 8,031,418 B2 | 10/2011 | Shiga |
| 8,264,556 B2 | 9/2012 | Hasuda |
| 8,405,922 B2 | 3/2013 | Terahara |
| 2009/0002847 A1 | 1/2009 | Nakada et al. |
| 2010/0013939 A1 | 1/2010 | Ohno et al. |
| 2010/0060995 A1 | 3/2010 | Yumiki et al. |
| 2012/0200768 A1 | 8/2012 | Ito |
| 2013/0044381 A1 | 2/2013 | Ito |
| 2013/0077949 A1 | 3/2013 | Koga |
| 2013/0100540 A1 | 4/2013 | Koga |

FOREIGN PATENT DOCUMENTS

| | | |
|---|---|---|
| JP | H08-110456 A | 4/1996 |
| JP | 2000-304999 A | 11/2000 |
| JP | 2003-057522 A | 2/2003 |
| JP | 2010-038932 A | 2/2010 |

OTHER PUBLICATIONS

Notice of Allowance and Allowability dated Dec. 11, 2013 in a co-pending U.S. Appl. No. 13/561,081.

Official Communication for co-pending U.S. Appl. No. 13/561,083, issued Feb. 7, 2014.

\* cited by examiner

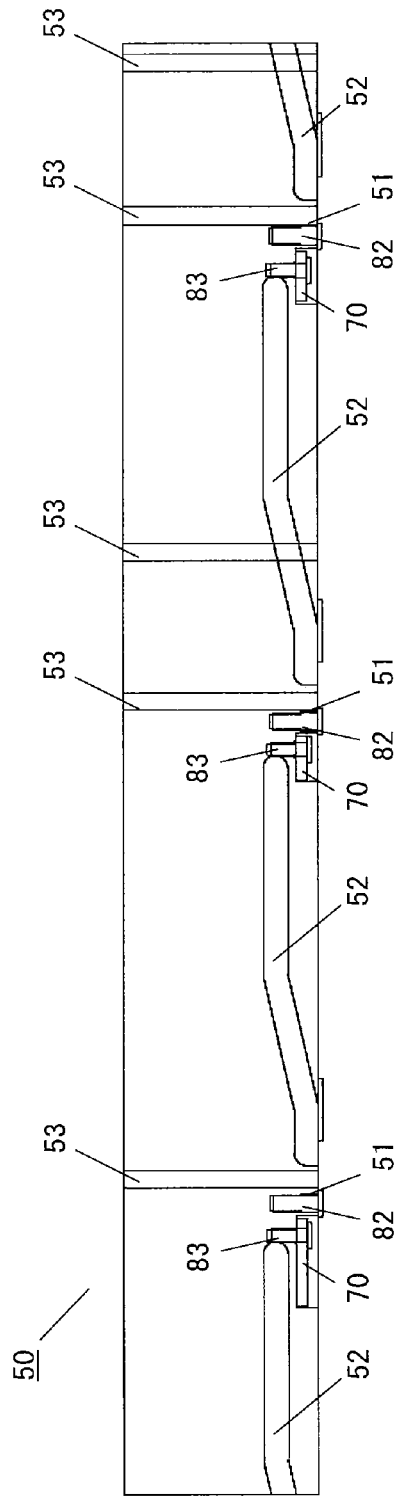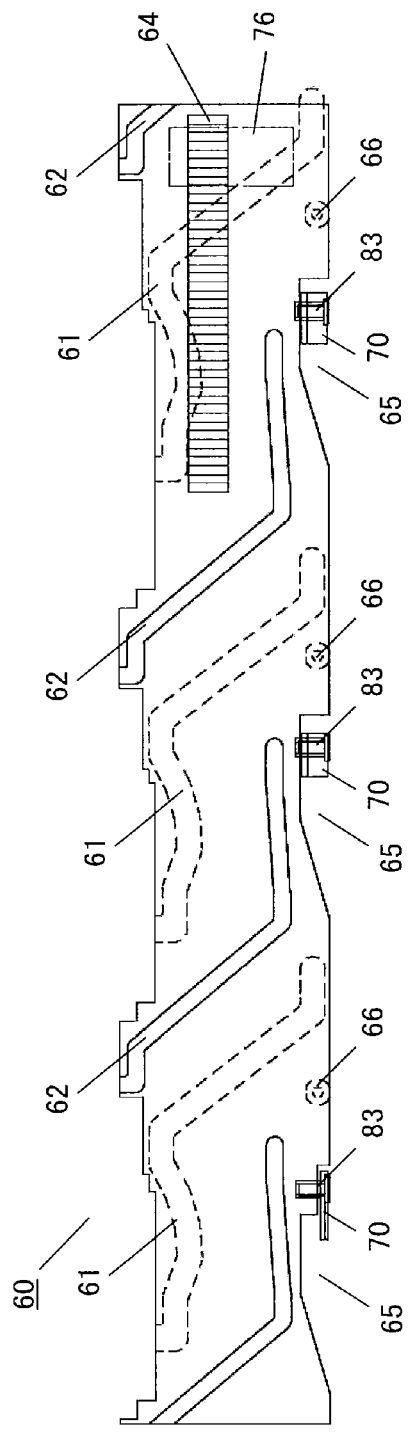

LENS BARREL AND IMAGING DEVICE

CROSS-REFERENCE TO RELATED APPLICATIONS

This application claims priority under 35 U.S.C. §119 to Japanese Patent Application No. 2011-206940, filed on Sep. 22, 2011 and Japanese Patent Application No. 2012-128557, filed on Jun. 6, 2012. The entire disclosure of Japanese Patent Application No. 2011-206940 and Japanese Patent Application No. 2012-128557 are hereby incorporated herein by reference.

BACKGROUND

1. Technical Field

The technology disclosed herein relates to a telescoping lens barrel.

2. Background Information

Imaging devices that produce image data about a subject have rapidly gained popularity in recent years. A lens barrel for adjusting the focal distance is mounted in these imaging devices. Examples of known imaging devices include cameras with an integrated lens and those with an interchangeable lens. A lens barrel is built into an integrated type of camera. A camera with an interchangeable lens has a camera body and a lens barrel that can be mounted to the camera body.

A conventional lens barrel is disclosed in Japanese Laid-Open Patent Application 2003-57522, for example. With this lens barrel, the focal distance can be adjusted by moving a lens group along the optical axis direction by rotating a cam barrel via a gear train linked to the motor. A clutch mechanism is installed for one of the gears in the gear train, and is designed so that torque over a certain level will not be transmitted from the motor to the cam barrel. If an external force that would rotate the cam barrel should be exerted when the lens barrel is dropped, for example, the clutch mechanism prevents damage to the gear train by interrupting excessive torque transmission.

SUMMARY

With respect to the lens barrel configuration discussed above, since the motor and the gear train are on the outside of the cam barrel, the lens barrel ends up being larger. In particular, with camera having an interchangeable lens, since the lens barrel is carried around separately, with a form in which the motor portion sticks outside of the cylindrical shape of the lens barrel, stowage is inefficient, and the motor portion is also susceptible to damage by being bumped, etc.

It is an object of the technology disclosed herein to provide a telescoping lens barrel that can be made more compact in its stowed state, and which is more resistant to internal damage by being dropped, etc.

The lens barrel disclosed herein comprises a first frame, a second frame, a drive actuator, and a transmission mechanism. The second frame is configured to be rotatably supported by the first frame. The drive actuator is configured to rotate the second frame with respect to the first frame. The transmission mechanism is configured to transmit the drive force of the drive actuator to the second frame. The second frame includes a substantially cylindrical main body, and a gear portion. The gear portion is disposed on the inner peripheral part of the main body. The gear portion is configured to transmit the drive force of the drive actuator via the transmission mechanism. The transmission mechanism includes a first transmission gear portion configured to engages with the gear portion, and a second transmission gear portion configured to be disposed coaxially with the first transmission gear portion. The transmission mechanism includes a clutch. The clutch is configured to temporarily disengage the transmission of the drive force between the first transmission gear portion and the second transmission gear portion.

With a lens barrel configured as above, the drive actuator, the transmission mechanism, and the clutch can be efficiently disposed on the inside of the rotating second frame, so the lens barrel can be made more compact. Also, even if the second frame is subjected to excessive torque due to being dropped, etc., the action of the clutch can prevent damage to the transmission mechanism.

An imaging device equipped with this lens barrel can be similarly made more compact.

The technology disclosed herein makes it possible to provide a lens barrel and an imaging device that can be made more compact and that are resistant to damage caused by being dropped or the like.

BRIEF DESCRIPTION OF THE DRAWINGS

Referring now to the attached drawings, which form a part of this original disclosure:

FIG. 7A is an inner peripheral development view of an outer frame 50;

FIG. 7B is an inner peripheral development view of a cam frame 60;

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

1. External Appearance

Figure 1:
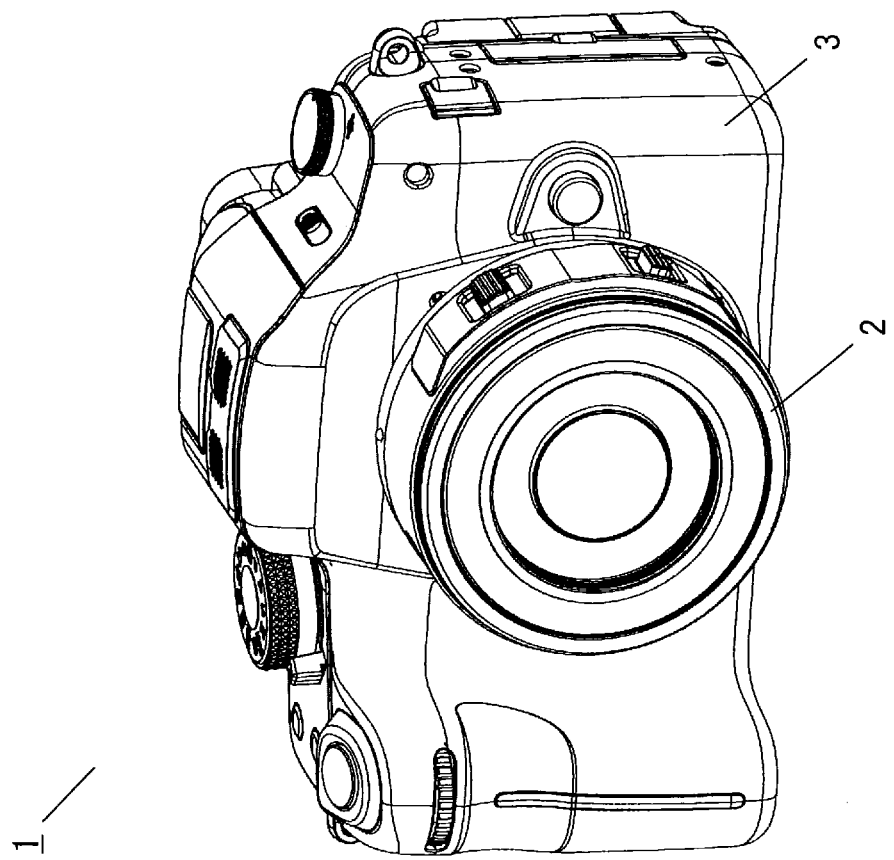
FIG. 1 is an oblique view of an imaging device 1.

FIG. 1 is an oblique view of an imaging device 1. The imaging device 1 is an interchangeable lens type of digital camera, and mainly comprises a camera body 3 and a lens barrel 2 that is removably mounted to the camera body 3.

Figure 2:
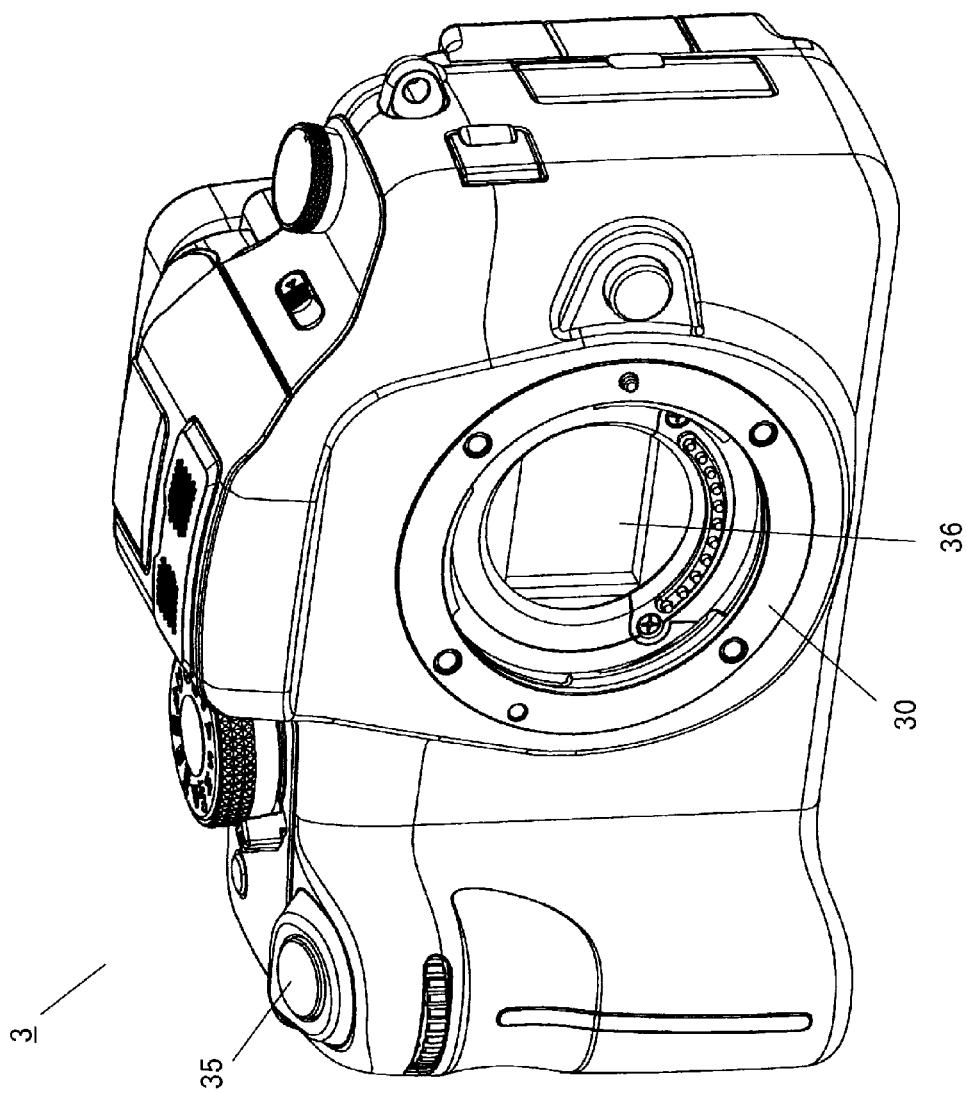
FIG. 2 is an oblique view of a camera body 3.

FIG. 2 is an oblique view of the camera body 3 when the lens barrel 2 has been removed. The camera body 3 comprises a body mount 30, which is the portion where the lens barrel 2 is attached, an imaging element 36 that captures an optical image formed by the lens barrel 2 and converts it into image data, and a shutter button 35.

Figure 3:
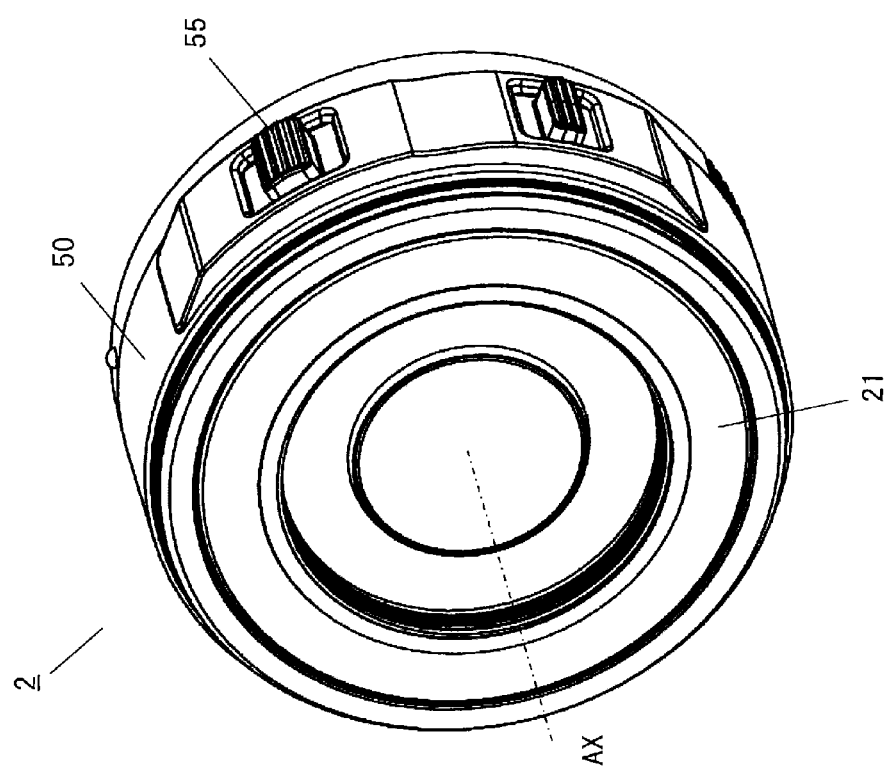
FIG. 3 is an oblique view of a lens barrel 2.

FIG. 3 is an oblique view of the lens barrel 2. FIG. 3 is an oblique view as seen from the subject side. The lens barrel 2 includes the outer frame 50 on its outermost periphery. The lens barrel 2 also supports a lens with a first lens frame 21. In FIG. 3, an optical axis AX is displayed as the optical axis of the lens. The "optical axis direction" is a direction along the optical axis AX, and is a direction that is parallel to the optical axis AX. A zoom lever 55 is provided to the outer peripheral part of the outer frame 50. The user can adjust the focal distance by operating the zoom lever 55.

2. Vertical Cross section of Lens Barrel 2

Figure 4:
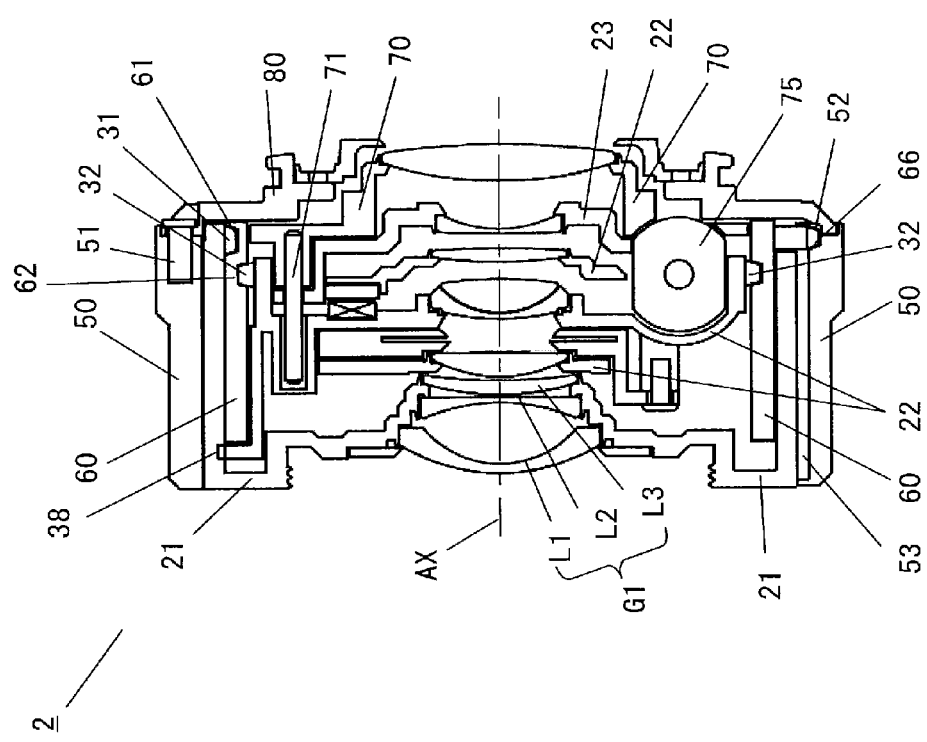
FIG. 4 is a cross section of the lens barrel 2 in its stowed state.

FIG. 4 is a vertical cross section of the lens barrel 2 when the cam frame 60 has moved all the way to the lens mount 80 side.

The outer frame 50 is fixed to the lens mount 80. The outer frame 50 supports the cam frame 60 rotatably and retractably along the optical axis direction. The outer frame 50 is a substantially cylindrical member. The fixed frame 70 is fixed to the lens mount 80.

The outer frame 50 is fixed by linking portions 51 (such as screws 82) to the lens mount 80. The linking portions 51 are inserted a specific length into the outer frame 50. More specifically, screws 82 of a specific length are threaded into female threads formed inside the outer frame 50. Cam grooves 52 and rectilinear grooves 53 are formed in the inner peripheral face of the outer frame 50.

The cam frame 60 includes cam followers 66 on its outer peripheral face. The cam followers 66 engage with the cam grooves 52 formed in the inner peripheral face of the outer frame 50. Consequently, when the cam frame 60 rotates with respect to the outer frame 50, the cam followers 66 move along the cam grooves 52. As a result, the cam frame 60 advances and retracts with respect to the outer frame 50. First cam grooves 61 are formed in the outer peripheral face of the cam frame 60. Second cam grooves 62 are formed in the inner peripheral face of the cam frame 60.

The cam frame 60 supports the first lens frame 21. First cam followers 31 are formed on the first lens frame 21. The first cam followers 31 engage with the first cam grooves 61. Consequently, when the cam frame 60 rotates with respect to the first lens frame 21, the first cam followers 31 move along the first cam grooves 61. As a result, the first lens frame 21 advances and retracts with respect to the cam frame 60. The first lens frame 21 supports lenses L1, L2, and L3.

The cam frame 60 supports a second lens frame 22. Second cam followers 32 are formed on the second lens frame 22. The second cam followers 32 engage with the second cam grooves 62. Consequently, when the cam frame 60 rotates with respect to the second lens frame 22, the second cam followers 32 move along the second cam grooves 62. As a result, the second lens frame 22 advances and retracts with respect to the cam frame 60. The second lens frame 22 supports lenses L4, L5, L6, and L7. An aperture unit 42 is attached to the second lens frame 22, and moves integrally with the second lens frame 22 along the optical axis direction. The cam frame 60 includes a cylindrical main body.

The fixed frame 70 supports a third lens frame 23 via a shaft 71. The third lens frame 23 is driven along the optical axis direction by a focus motor (not shown). The third lens frame 23 supports a lens L8. The fixed frame 70 supports a lens L9. A stepping motor, for example, is used as the focus motor.

A motor 75 is fixed to the fixed frame 70. The motor 75 is disposed on the inner peripheral side of the cam frame 60. The motor 75 is a drive means for rotating the cam frame 60.

In this embodiment, an example was given in which the optical system was made up of four groups of lenses, but the present technology is not limited to this.

Figure 5:
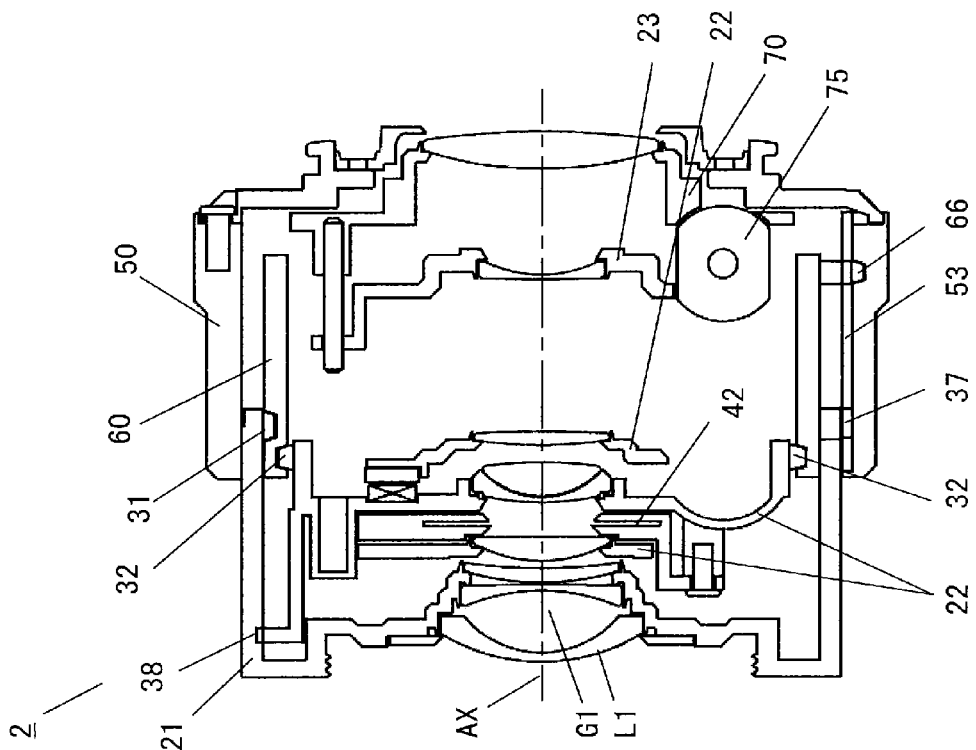
FIG. 5 is a cross section of the lens barrel 2 at the wide angle end.

FIG. 5 is a cross section showing the situation in imaging at the wide angle end, while the lens barrel 2 is in use. Since the lens barrel 2 is being used, the cam followers 66 are located more to the subject side than in the state shown in FIG. 4. Accordingly, the cam frame 60 is extended with respect to the outer frame 50.

Figure 6:
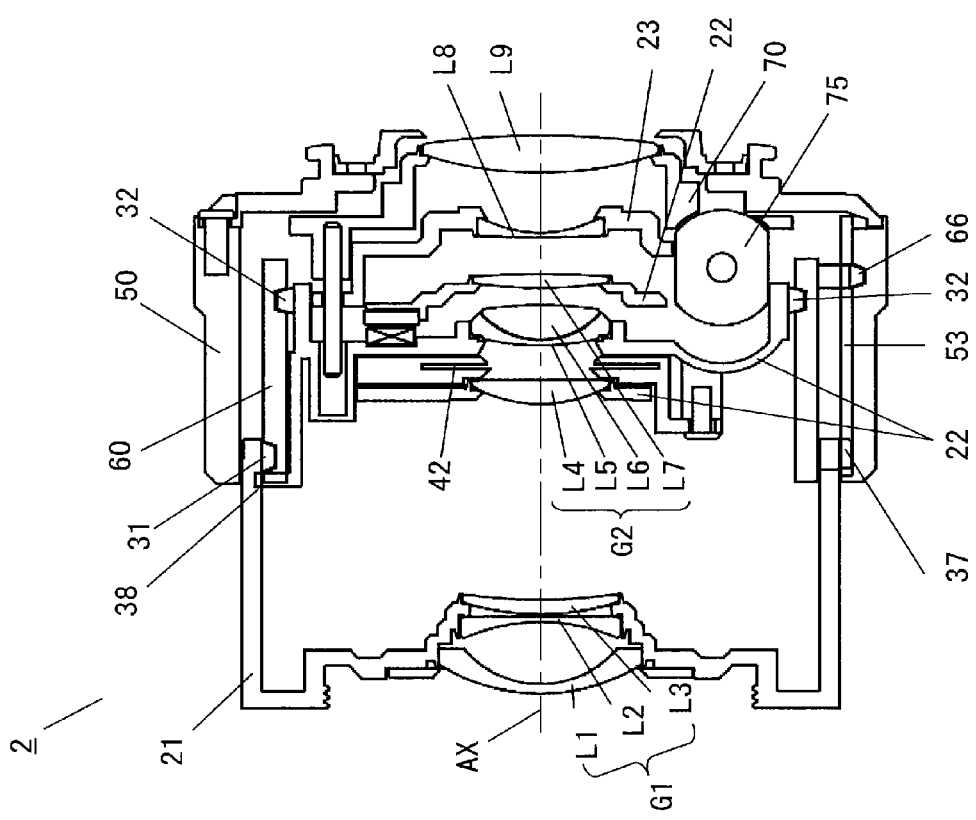
FIG. 6 is a cross section of the lens barrel 2 at the telephoto end.

FIG. 6 is a cross section showing the situation in imaging at the telephoto end, while the lens barrel 2 is in use. As shown in FIGS. 5 and 6, the state of zooming is varied by adjusting the positions of the first lens frame 21 and the second lens frame 22.

3. Cam Grooves

FIG. 7A is a development view of the inner periphery of the outer frame 50. The rectilinear grooves 53 are used to guide so that the first lens frame 21 does not rotate. Rectilinear protrusions 37 formed on the first lens frame 21 engage with the rectilinear grooves 53. The cam grooves 52 are provided at three locations in the inner peripheral face of the outer frame 50. The rectilinear grooves 53 are provided at five locations in the inner peripheral face of the outer frame 50.

Screws 83 pass through the lens mount 80 and the fixed frame 70 and are inserted into the outer frame 50. This fixes the fixed frame 70, the lens mount 80, and the outer frame 50 to each other. The screws 83 and the linking portions 51 are each provided at three places.

The three linking portions 51 are respectively disposed between the three cam grooves 52 in the peripheral direction, and do not interfere with the cam grooves 52.

FIG. 7B is a development view of the inner periphery of the cam frame 60. The second cam grooves 62 and a gear portion 64 are provided to the inner peripheral face of the cam frame 60. The gear portion 64 meshes with a gear provided to a transmission mechanism 76, and transmits the drive force of the motor 75 to the cam frame 60.

The first cam grooves 61 and the cam followers 66 are provided to the outer peripheral face of the cam frame 60.

Cut-outs 65 are provided to the end of the cam frame 60 on the lens mount 80 side. The cut-outs 65 are provided at locations at the end of the cam frame 60 on the lens mount 80 side. In the location, the cut-outs 65 do not interfere with the first cam grooves 61 and the second cam grooves 62. Specifically, the cut-outs 65 are disposed at locations that are away from the first cam grooves 61 in the peripheral direction, and are disposed at locations that are away from the second cam grooves 62 along the optical axis direction.

4. Details of Interior of Lens Barrel 2

Figure 8:
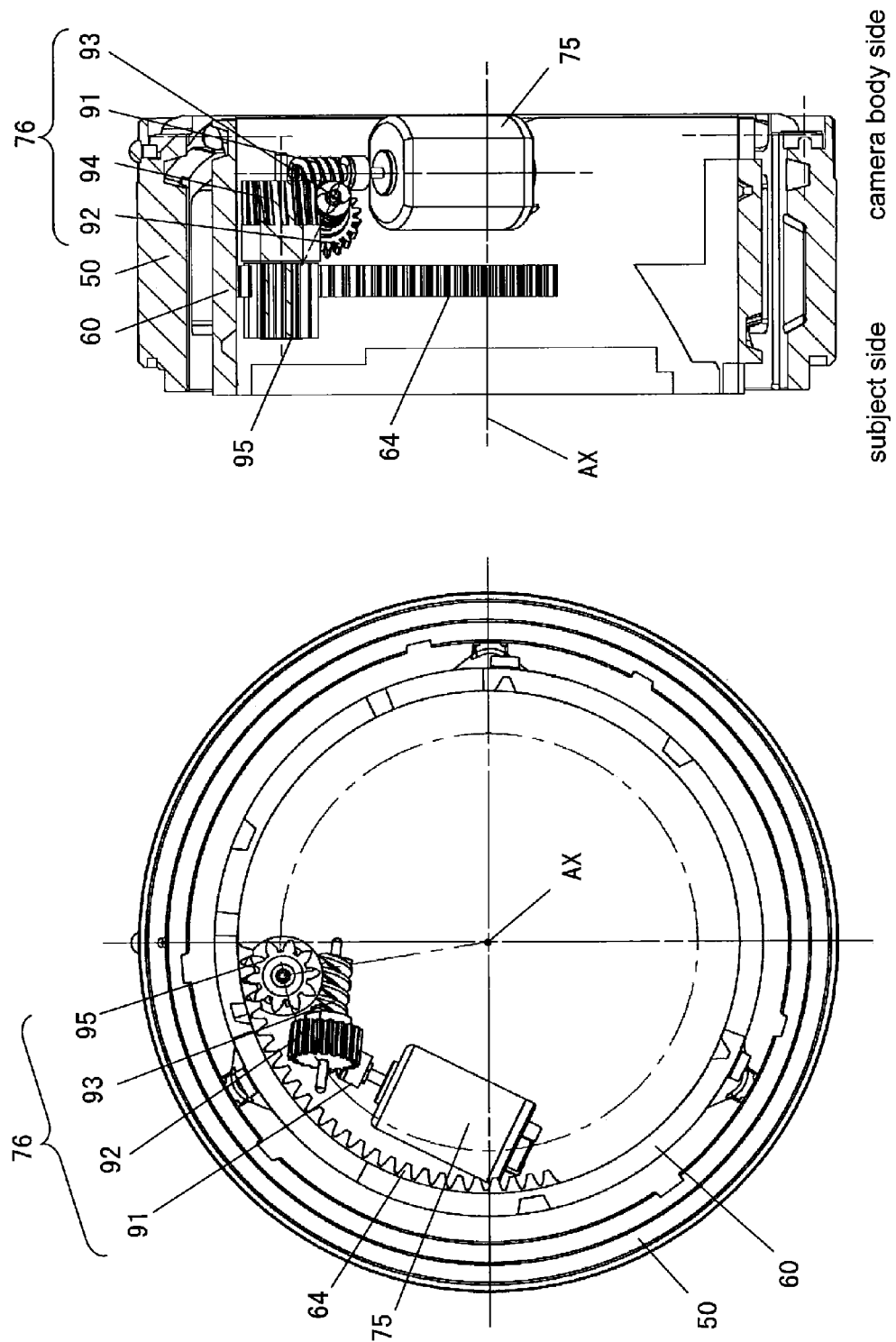
FIG. 8 is a detail view of the interior of the lens barrel 2.

FIG. 8 shows detail front and side views of the interior of the lens barrel 2 as seen from the subject side. The motor 75 and the transmission mechanism 76 are provided in the interior of the lens barrel 2. The transmission mechanism 76 is made up of a first worm gear 91, a first worm wheel 92, a second worm gear 93, and a second worm wheel 94. The first worm gear 91 is attached to the output shaft of the motor 75 and rotates integrally with the output shaft. The first worm gear 91 meshes with the first worm wheel 92. The first worm wheel 92 includes a rotational axis that coincides with that of the second worm gear 93, and rotates integrally. The second worm gear 93 meshes with the second worm wheel 94. The second worm wheel 94 includes a rotational axis that coincides with that of a drive gear 95, and rotates integrally. The drive gear 95 meshes with the gear portion 64. Consequently, the rotational drive force of the motor 75 is transmitted through the transmission mechanism 76 to the cam frame 60.

Figure 9:
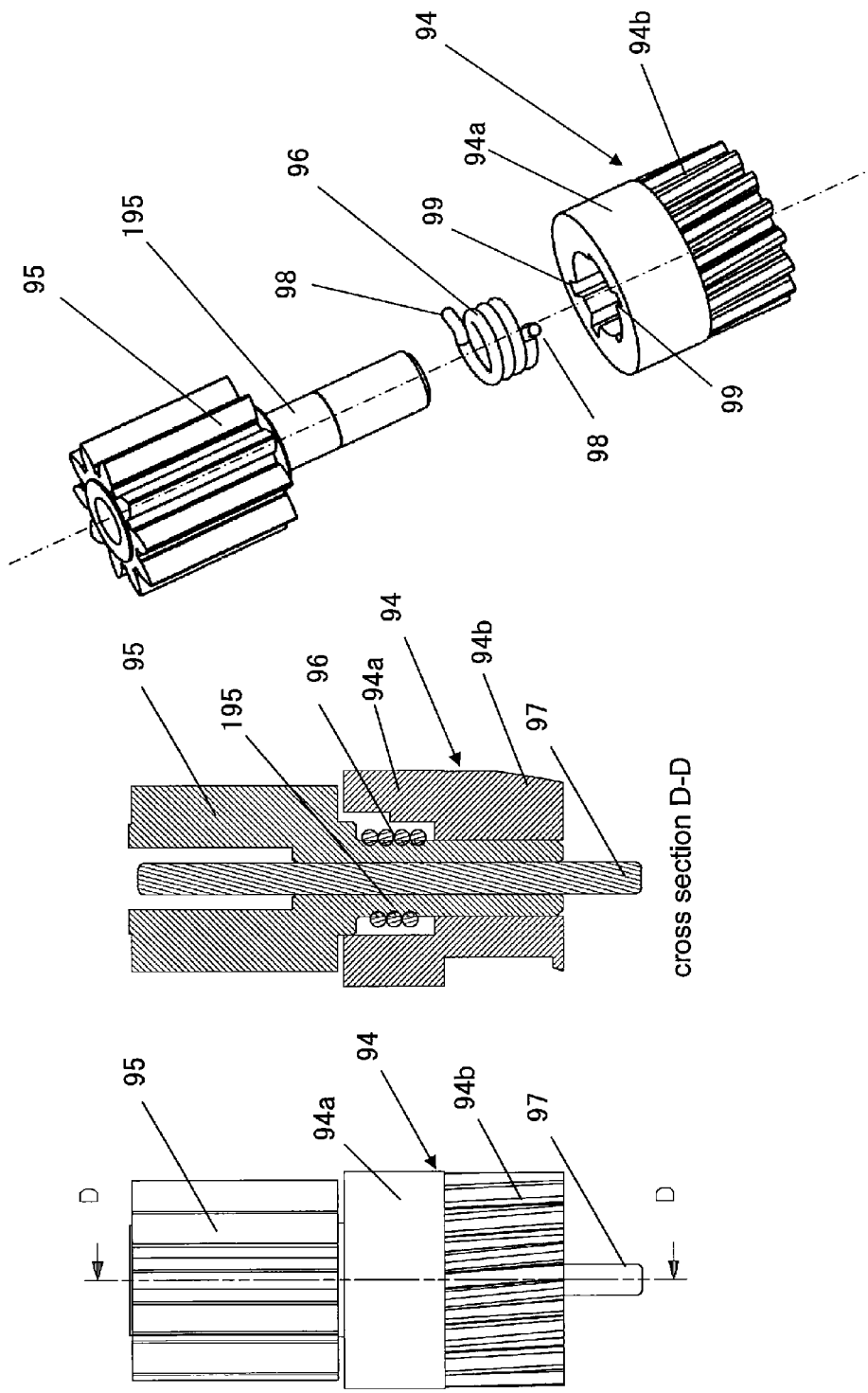
FIG. 9A is a detail view of a drive gear 95 and a second worm wheel 94.
FIG. 9B is an oblique view of the drive gear 95 and the second worm wheel 94.

FIG. 9A is a detail view of the second worm wheel 94 and the drive gear 95. The drive gear 95 is capable of rotating around a gear shaft 97. The second worm wheel 94 includes an engagement portion 94a and a gear portion 94b. A torsion coil spring 96 engages with the engagement portion 94a. The gear portion 94b is the portion of the second worm wheel 94 where the gear is formed. The gear portion 94b is formed integrally with the engagement portion 94a.

The torsion coil spring 96 is attached in a state of having been tightened with a specific force to a mating portion 195 of the drive gear 95. If the torsion coil spring 96 has not been mounted to the mating portion 195, the inside diameter of the torsion coil spring 96 is smaller than the inside diameter of the mating portion 195 of the drive gear 95. The torsion coil spring 96 and the drive gear 95 rotate integrally.

FIG. 9B is an oblique view of the drive gear 95 and the second worm wheel 94. Bent parts 98 are formed at the ends of the torsion coil spring 96. Grooves 99 are formed on the inner peripheral side of the second worm wheel 94, and the bent parts 98 are inserted. More specifically, the bent parts 98 are inserted into the grooves 99 formed on the inner peripheral side of the engagement portion. The bent parts 98 is inserted into the grooves 99. Inserting the bent parts 98 into the grooves 99 allows the second worm wheel 94 to rotate around the gear shaft 97 integrally with the drive gear 95. A gap E (play) is provided between the bent parts 98 and the grooves 99. The transmission of torque is temporarily disengaged in the clutch mechanism (discussed below) by this gap E.

The outside diameters of the drive gear 95 and the second worm wheel 94 are substantially equal. The rotational axis of the drive gear 95 and the second worm wheel 94 is parallel to the optical axis direction. The torsion coil spring 96 that is part of the clutch mechanism is disposed between the drive gear 95 and the second worm wheel 94. The drive gear 95, the torsion coil spring 96, and the second worm wheel 94 are disposed so as not to overlap along the optical axis direction. In other words, the torsion coil spring 96 is disposed between the drive gear 95 and the portion of the second worm wheel 94 where the gear is formed, along the optical axis direction. More specifically, the torsion coil spring 96 is disposed between the drive gear 95 and the gear portion 94b of the second worm wheel 94 along the optical axis direction.

If a force is generated that would move the first lens frame 21 along the optical axis direction, such as when the first lens frame 21 hits a wall while the lens barrel 2 is being used for imaging, the first cam followers 31 press on the inclined faces of the first cam grooves 61 and generate torque that rotates the cam frame 60. The torque that rotates the cam frame 60 is transmitted to the drive gear 95 and the second worm wheel 94. In this case, however, since the second worm gear 93 does not reverse, the second worm wheel 94 is does not rotate and locked. When the rotation of the torsion coil spring 96, which rotates integrally with the drive gear 95, is restricted by the grooves 99 that mate with the bent parts 98, a force in generated in the bent parts 98 that loosens the torsion coil spring 96 and expands its inside diameter, so that the drive gear 95 freewheels. This temporarily disengages the transmission of torque. Thus, the torsion coil spring 96 functions as a clutch mechanism between the drive gear 95 and the second worm wheel 94.

The upper limit to the torque that can be transmitted from the drive gear 95 to the second worm wheel 94 is set to a value that will not damage the gears of the transmission mechanism 76. The torque transmission upper limit value is adjusted according to the material, gauge, inside diameter, and so forth of the torsion coil spring.

Figure 10:
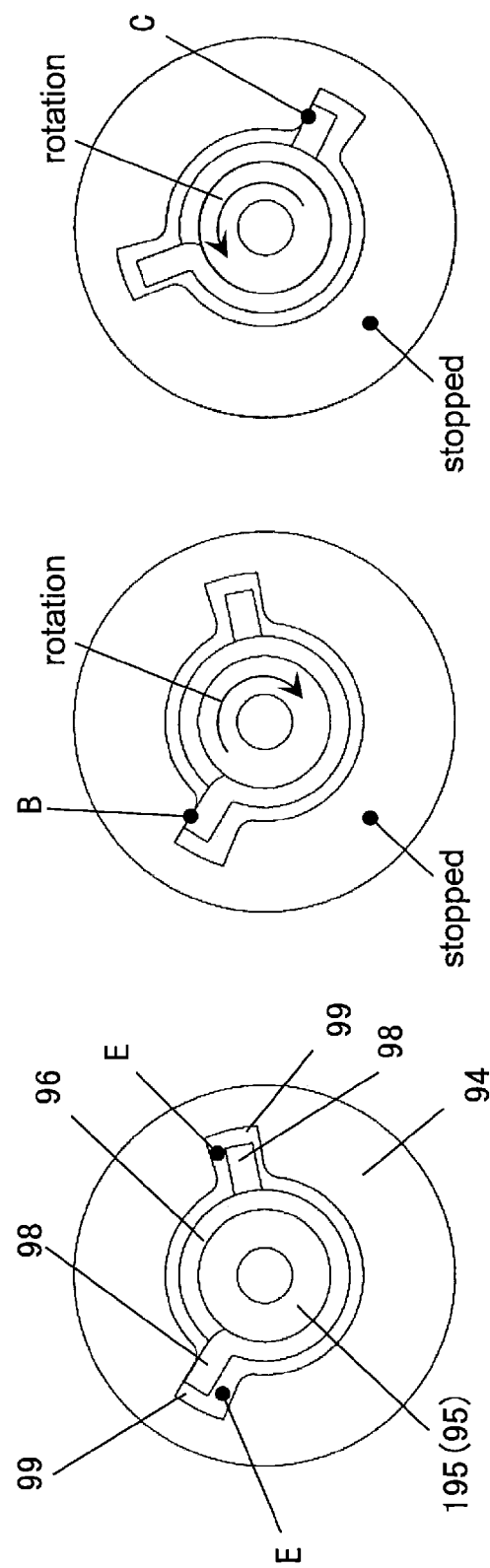
FIG. 10 is a diagram of clutch operation.

Finally, the operation of the clutch will be described. As shown in FIG. 10, at least two grooves 99 are formed in the second worm wheel 94. The bent parts 98 of the torsion coil spring 96 are inserted into the grooves 99. When the shaft part (mating portion 195) that is integral with the drive gear 95 rotates clockwise in a state in which the second worm wheel 94 is stopped, a force pressing the bent part 98 in the opposite direction from the rotational direction is generated at point B. The force pressing on the bent part 98 expands the inside diameter of the torsion coil spring 96, allowing the mating portion 195 to slide in the rotational direction with respect to the torsion coil spring 96, and the transmission of rotational force to the second worm wheel 94 is disengaged.

When the shaft part (mating portion 195) that is integral with the drive gear 95 rotates counter-clockwise in a state in which the second worm wheel 94 is stopped, a force pressing the bent part 98 in the opposite direction from the rotational direction is generated at point C. Consequently, the transmission of rotational force to the second worm wheel 94 is disengaged.

With this clutch, the grooves 99 and the gap E between the grooves 99 and the bent parts 98 are provided in order to loosen the torsion coil spring 96.

5. Conclusion (1) The lens barrel 2 in a mode of the present technology comprises the outer frame 50, the cam frame 60, the motor 75, and the transmission mechanism 76. The gear portion 64, to which the rotational force of the motor 75 is transmitted, is provided on the inner peripheral side of the cam frame 60. The transmission mechanism 76 includes the drive gear 95 that meshes with the gear portion 64, and the second worm wheel 94 that is disposed coaxially with the drive gear 95. The transmission mechanism 76 includes the clutch 96 which temporarily disengage transmission torque between the drive gear 95 and the second worm wheel 94. The cam frame 60 is disposed more to the inner peripheral side than the outer frame 50, and is supported rotatably with respect to the outer frame 50. The first cam followers 31 formed on the first lens frame 21 mate with the first cam grooves formed in the outer periphery of the cam frame 60. When the cam frame 60 rotates, this allows the first lens frame 21 to advance and retract along the optical axis direction.

Consequently, even if the first lens frame 21 should be subjected to impact force while the lens barrel 2 is in use, and a force is generated that moves the first lens frame 21 along the optical axis direction, the transmission of torque between the drive gear 95 and the second worm wheel 94 is interrupted, and this prevents damage to the transmission mechanism 76.

(2) With the lens barrel 2 in this embodiment, the transmission mechanism 76 is disposed on the inner peripheral side of the cam frame 60.

This prevents part of the outside cylindrical shape of the lens barrel 2 from becoming larger, so the lens barrel 2 can be made more compact. Also, the lens barrel 2 is easier to stow away when removed from the camera body 3. Also, when the transmission mechanism 76 is stowed inside the lens barrel 2, damage caused by bumping the transmission mechanism 76 during transportation, etc., can be prevented.

(3) With the lens barrel 2 in this embodiment, the outside diameters of the drive gear 95 and the second worm wheel 94 are substantially equal. The rotational axis of the drive gear 95 and the second worm wheel 94 is parallel to the optical axis direction, and the torsion coil spring 96 that is part of the clutch mechanism is disposed between the drive gear 95 and the second worm wheel 94. The drive gear 95, the torsion coil spring 96, and the second worm wheel 94 are disposed so as not to overlap along the optical axis direction. More precisely, the torsion coil spring 96 is disposed between the drive gear 95 and the portion of the second worm wheel 94 where the gear is formed, along the optical axis direction.

This allows the outside diameter of the gear parts that make up the clutch to be reduced, so they can be disposed more efficiently inside the lens barrel 2, and the lens barrel 2 can be made more compact.

(4) The second worm wheel 94 includes an engagement portion 94a and a gear portion 94b. The engagement portion 94a is the portion that engages with the torsion coil spring 96. The gear portion 94b is the portion of the second worm wheel 94 where the gear is formed. The gear portion 94b is formed integrally with the engagement portion 94a. The torsion coil spring 96 is disposed between the drive gear 95 and the gear portion along the optical axis direction.

Consequently, the outside diameter of the second worm wheel 94 can be smaller than when the gear portion 94b is formed to the outside of the torsion coil spring 96. Specifically, the outside diameter of the gear parts that make up the clutch can be reduced, so they can be disposed more efficiently inside the lens barrel 2, and the lens barrel 2 can be made more compact.

(5) With the lens barrel 2 in this embodiment, the transmission mechanism 76 includes the first worm gear 91, the first worm wheel 92, the second worm gear 93, and the second worm wheel 94. The first worm gear 91 is fixed to the rotary shaft of the motor 75. The first worm wheel 92 meshes with the first worm gear 91. The second worm gear 93 includes a rotational axis that coincides with that of a first worm wheel 92, and rotates integrally with the second worm wheel 94. The second worm wheel 94 meshes with the second worm gear 93.

Consequently, the transmission mechanism 76 can be configured in a form that conforms to the inner peripheral face of the cam frame 60. Accordingly, the second lens frame 22 and so forth on the inside of the transmission mechanism 76 can be disposed more efficiently, and the lens barrel 2 can be smaller in diameter.

(6) With the imaging device 1 in this embodiment, the above-mentioned lens barrel 2 is mounted to the camera body 3 that is equipped with an imaging element that captures an optical image formed by the lens barrel 2 and converts it into image data. This affords a more compact imaging device 1.

Other Embodiments

The present technology is not limited to or by the embodiment given above, and various modifications and alterations are possible without departing from the gist of the technology.

Those portions having substantially the same function as the portions in the first embodiment discussed above will be numbered the same and will not be described again in detail.

(1) In the above embodiment, an imaging device was described by using the imaging device 1 as an example, but the imaging device is not limited to being the imaging device 1. For example, the imaging device 1 can capture both still and moving pictures, but the imaging device may be one that captures only still pictures, or one that captures only moving pictures.

(2) In the above embodiment, a lens barrel was described by using the lens barrel 2 as an example, but the lens barrel is not limited to being the lens barrel 2. For example, the lens barrel may be one that is used in an integrated type of imaging device, rather than an interchangeable lens barrel.

(3) In the above embodiment, the motor 75 was described as an example, but the motor 75 is not limited to being a DC motor, and may instead be another type of motor (such as a stepping motor).

(4) In the above embodiment, the transmission mechanism 76 was constituted by a worm gear and a worm wheel, but may instead be constituted by a spur gear.

(5) In the above embodiment, the clutch mechanism was constituted by the torsion coil spring 96, but may instead have some other configuration, such as a compression spring.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device. Accordingly, these terms, as utilized to describe the present technology should be interpreted relative to the lens barrel and the imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

Industrial Applicability

The lens barrel described above allows for a reduction in size, and is therefore useful in the field of imaging devices.

What is claimed is:
1. A lens barrel, comprising:
a first frame;
a second frame configured to be rotatably supported by the first frame;
a drive actuator configured to rotate the second frame with respect to the first frame; and a transmission mechanism configured to transmit the drive force of the drive actuator to the second frame, wherein
the second frame includes:
a substantially cylindrical main body; and
a gear portion disposed on the inner peripheral part of the main body and to which the drive force of the drive actuator is transmitted via the transmission mechanism,
the transmission mechanism includes:
a first transmission gear portion configured to engage with the gear portion; and
a second transmission gear portion configured to be disposed coaxially with the first transmission gear portion, and
the transmission mechanism includes a clutch configured to temporarily disengage the transmission of the drive force between the first transmission gear portion and the second transmission gear portion.

2. The lens barrel according to claim 1, wherein
the transmission mechanism is disposed on the inner peripheral side of the second frame.

3. The lens barrel according to claim 1, wherein
the outside diameters of the first transmission gear portion and the second transmission gear portion are substantially equal,
the rotational axes of the first transmission gear portion and the second transmission gear portion are substantially parallel to the optical axis, and
the clutch is disposed between the first transmission gear portion and the portion of the second transmission gear portion where the gear is formed, along the optical axis direction.

4. The lens barrel according to claim 1, wherein
the second transmission gear portion includes an engagement portion with which the clutch engages, and a gear portion that is formed integrally with the engagement portion and in which a gear is formed on the second transmission gear portion, and
the clutch is disposed between the first transmission gear portion and the gear portion along the optical axis direction.

5. The lens barrel according to claim 1, wherein
the transmission mechanism further includes:
a first worm gear fixed to the rotary shaft of the drive actuator;
a first worm wheel configured to mesh with the first worm gear; and
a second worm gear formed integrally with the first worm wheel, rotational axis of the second worm gear coinciding with rotational axis of the first worm wheel, and
the second worm gear and the second transmission gear portion mesh with each other.

6. An imaging device, comprising:
the lens barrel according to claim 1; and
an imaging element configured to capture an optical image formed by the lens barrel and converts it into image data.

* * * * *